US005301421A

United States Patent [19]

Strefling

[11] Patent Number: 5,301,421

[45] Date of Patent: Apr. 12, 1994

[54] METHOD AND APPARATUS FOR MAKING FLUID COOLED CONDUCTOR

[75] Inventor: Dennis E. Strefling, Mt. Clemens, Mich.

[73] Assignee: Electro-Max Mfg. Co., Clinton Township, Macomb County, Mich.

[21] Appl. No.: 34,724

[22] Filed: Mar. 22, 1993

Related U.S. Application Data

[62] Division of Ser. No. 783,853, Oct. 28, 1991, Pat. No. 5,229,543.

[51] Int. Cl.[5] ........................ H01R 43/04; B23P 19/00

[52] U.S. Cl. ........................................ 29/863; 29/751; 29/753; 29/862; 174/15.6; 174/19; 439/191; 439/196

[58] Field of Search ............... 439/196, 191; 174/15.7, 174/15.6, 19; 29/863, 751, 753, 860, 862

[56] References Cited

U.S. PATENT DOCUMENTS

| | | | |
|---|---|---|---|
| 2,835,721 | 5/1958 | Leathers | 174/19 X |
| 2,965,147 | 12/1960 | Hoffman | 29/863 X |
| 3,146,519 | 9/1964 | Redwine | 29/862 |
| 4,322,123 | 3/1982 | Newell | 29/751 X |
| 4,394,533 | 7/1983 | Naito | 29/863 X |
| 4,442,312 | 4/1984 | Oshkin et al. | 174/19 X |
| 4,640,982 | 2/1987 | Kasper et al. | 174/19 X |

*Primary Examiner*—Carl J. Arbes
*Attorney, Agent, or Firm*—Dykema Gossett

[57] ABSTRACT

A fluid cooled conductor including a wire rope or braid having ferrules forged on both ends thereof, said ferrules having a channel formed in the periphery thereof to provide a channel for fluid passage between the wire rope or braid and a terminal crimped to the ferrule. The terminal has a fluid passage communicating with the passage in the ferrule. A rubber hose is clamped between terminals in a water tight fashion, thereby providing a continuous fluid passage beginning with the fluid passage in the terminal, continuing about the periphery of the wire rope or braid, and terminating in the fluid passage on a terminal connected to the other end of the wire rope or braid. A method of making the fluid cooled connector is disclosed which includes placing the ferrule about one or both ends of a wire rope or braid, squeezing the ferrule with sufficient pressure to forge it into the wire rope or braid, and pressing a fluid carrying channel in the ferrule after it is forged onto the end of the cable. An apparatus is disclosed for performing the method.

9 Claims, 4 Drawing Sheets

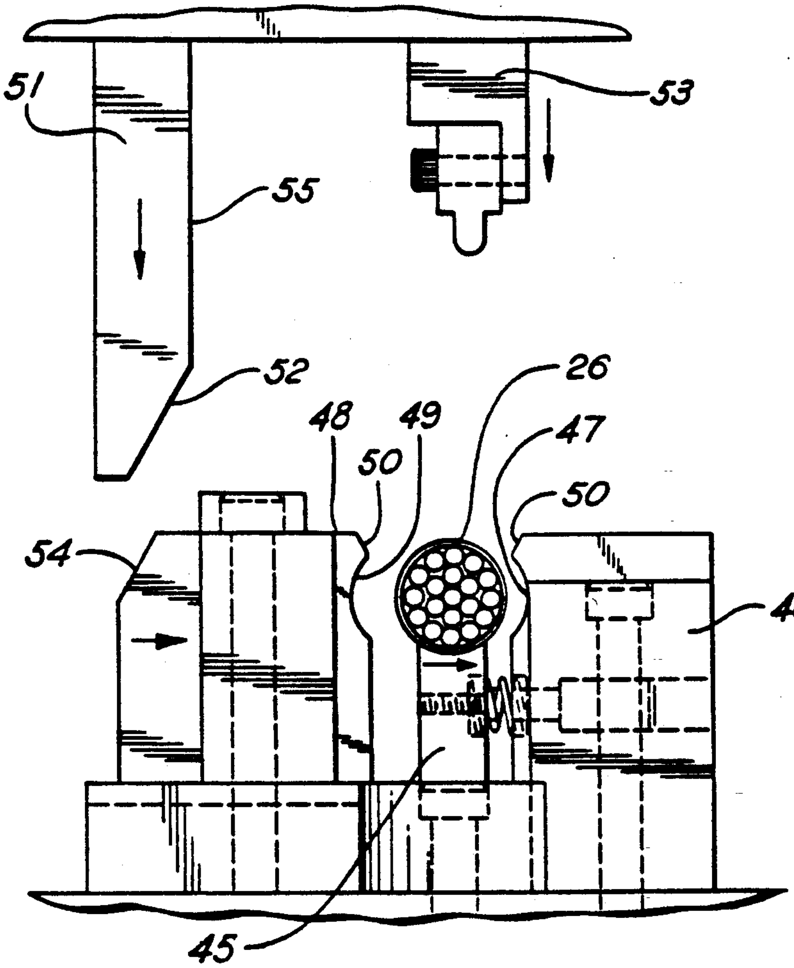
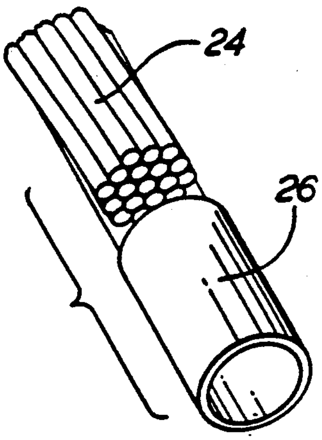
FIG.5
FIG.5A
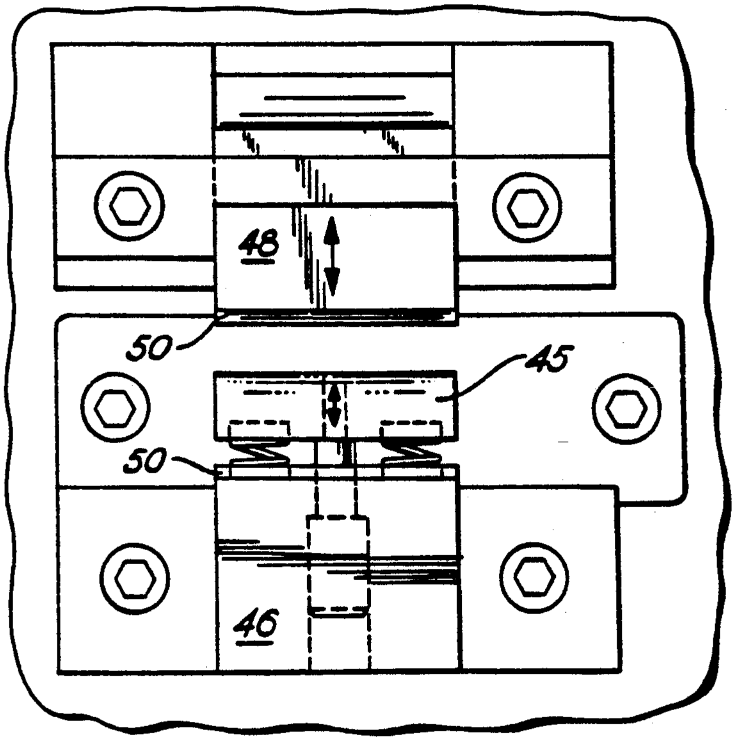
FIG.6

METHOD AND APPARATUS FOR MAKING FLUID COOLED CONDUCTOR

This is a divisional of copending application Ser. No. 07/783,853 filed on Oct. 28, 1991, now U.S. Pat. No. 5,229,543 issued Jul. 20, 1993.

BACKGROUND OF THE INVENTION

1. Field of the Invention

The present invention relates to power conducting cables. More particularly, the invention relates to a fluid-cooled secondary power conductor and a method of making the same. The construction disclosed provides a fluid-cooled power conductor which is greatly simplified in construction in comparison to prior art fluid-cooled power conductors, and is much stronger than said prior art conductors.

2. Description of the Prior Art

The use of wire ropes or braids made of copper to carry heavy current loads is well known in the art. These wire ropes or braids generally have a terminal mechanically connected on each end, and are of an air-cooled or a fluid-cooled construction. Regardless of their construction there has been a longstanding problem in the prior art as to how to satisfactorily connect a solid copper terminal to a braided wire rope. Many means of making these connections have been tried, but none have been satisfactory until the time of the present invention either because the cost of making the connection is very high, or because the connection is not permanent and the terminal works loose from the wire braid during use.

The problem of how to connect a terminal to the conductors in a fluid-cooled secondary power conductor, such as those used in the resistance welding industry, presents even greater problems as the connections must be made at the same time fluid passages are provided for cooling. One such fluid-cooled power conductor made by the assignee of the present invention has a terminal mechanically connected to an arrangement of six conductors arranged in a helically wound alternate polarity position about a six compartment separator having fluid passages at the interior thereof. This conductor has proved satisfactory in operation but is somewhat costly to manufacture. By first forging or swaging a ferrule to a wire rope or braid while simultaneously forming a fluid channel in said ferrule, and then crimping a terminal having a fluid passage which connects to the channel in the ferrule, a more permanent mechanical connection is made, and at the same time, the possibility for the first time is given of circulating fluid about the outside of the wire rope or braid instead of having interior water passages, as was generally done heretofore. This has solved longstanding problems in the fluid-cooled power conductor art.

SUMMARY OF THE PRESENT INVENTION

In accordance with the present invention, there is provided a fluid-cooled power conductor including a wire rope or braid having ferrules forged on each end thereof. While the ferrules are being forged thereon, a channel is pressed therein which will communicate with a mating fluid passage in a terminal which is crimped onto each ferrule. The forging of the ferrule provides a permanent connection by providing enough pressure to essentially made the wire rope or braid become solid within the ferrule, removing the possibility of the ferrule separating from the wire rope or braid. This enables one to crimp a terminal to the ferrule by means well known in the art, and a permanent connection is made. A passage in the terminal communicates with the channel in the ferrule to conduct fluid to the periphery of the wire rope or braid. The water is contained in this peripheral area by means of a rubber hose. Clamps clamp each end of the rubber hose onto its respective terminal.

Thus, it is an object of the present invention to provide an improved fluid-cooled power conductor.

It is a further object of the present invention to provide a method of manufacturing an improved fluid-cooled power conductor.

It is a further object of the present invention to provide an improved method of attaching terminals to conductors in the form of wire ropes or braids.

It is a further object of the present invention to provide an improved apparatus for making an improved connection to an end of a wire rope or braid.

A still further object of the present invention is to provide a fluid-cooled power conductor where water is circulated about the periphery of a wire rope or braid connected between the terminals thereof.

A still further object of the present invention is to provide an improved fluid-cooled secondary power conductor having the terminals thereof forged or swaged onto the wire rope or braid forming the conductor thereof.

Further objects and advances of this invention will be apparent from the following description and appended claims, reference being had to the accompanying drawings forming a part of the specification, wherein like reference characters designate corresponding parts in the several views.

BRIEF DESCRIPTION OF THE DRAWINGS

FIG. 5 is a diagrammatic view of one of the steps used in the method or process of the present invention, and involving placing a copper ferrule over one end of a wire rope or braid.

FIG. 5-A is a diagrammatic illustration of an apparatus used in the method or process of the present invention, showing how the ferrule of FIG. 5 is forged or swaged onto one end of the wire rope or braid.

FIG. 6 is a plan view of the apparatus used in the step of FIG. 5-A, with the ferrule removed for the sake of charity.

FIG. 7-A shows the apparatus of FIG. 5A just before a forming die is to press a channel into the ferrule of FIG. 7.

FIG. 8-A is a partial perspective view showing the construction of FIG. 7 after the step shown in FIG. 8 has been performed.

Figure 1:
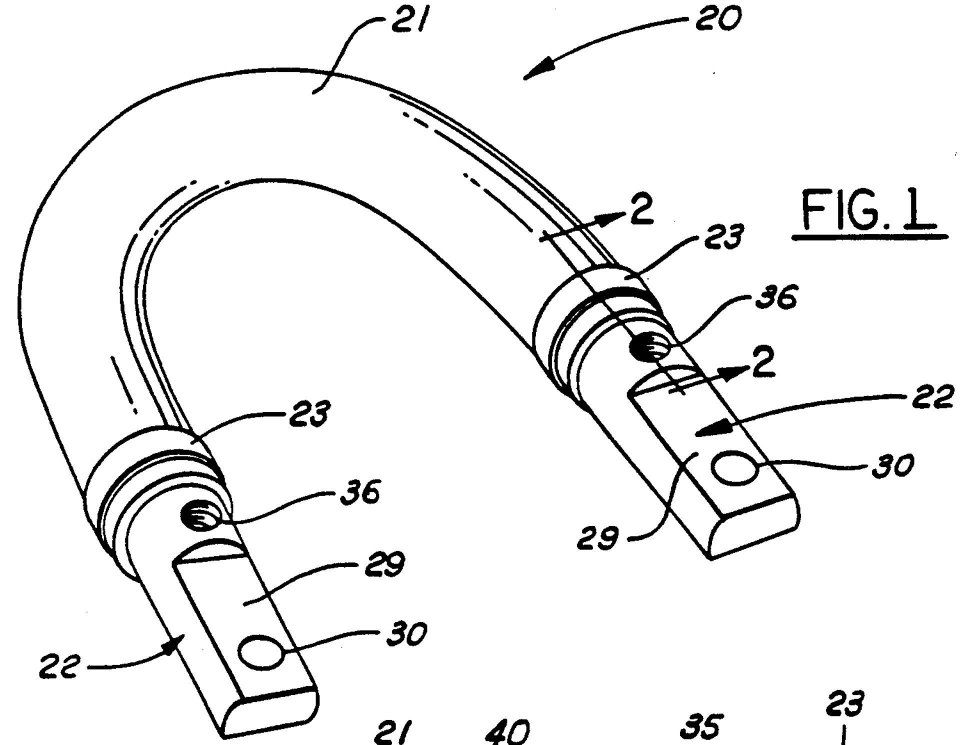
FIG. 1 is a perspective view of the improved fluid-cooled power conductor of the present invention.
Figure 2:
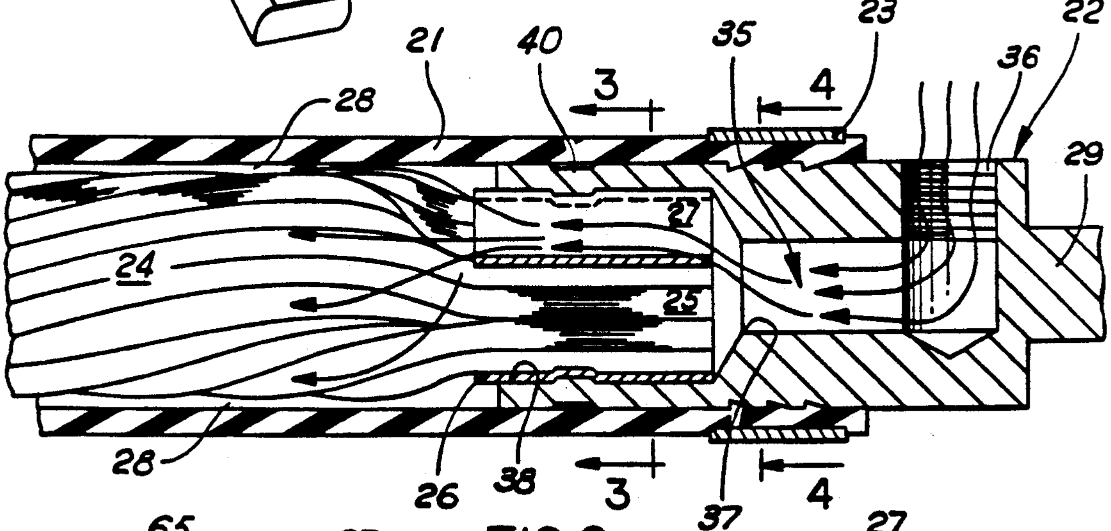
FIG. 2 is a sectional view, taken in the direction of the arrows, along the section line 2—2 of FIG. 1.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DETAILED DESCRIPTION OF THE PREFERRED EMBODIMENTS

Referring now to FIGS. 1–4, there is shown a fluid cooled power conductor or cable, generally designated by the numeral 20, including a wire rope or braid 24 having terminals 22 mounted on each end thereof, and having a hose or covering 21 being clamped to the terminals 22 by holding devices, such as clamps 23 and the like.

The wire rope 24, on at least one end thereof, has a compressed, swaged, or forged portion 25 contained within a ferrule 26. The ferrule 26 has a depression or channel 27 formed therein communicating at one end thereof with the fluid passageway 28 formed between the periphery of the wire rope 24 and the hose or covering 21.

Each terminal, generally designated by the numeral 22, is in the form of an elongated cylinder having a flattened tang or connecting portion 19. A hole 30 (see FIGS. 1 and 9) is provided for connecting the terminal 22 to a power supply (not shown). A slot, or other type of connecting means may be supplied in place of the hole 30, if desired. Also, the tank 29 may be angled. Almost any type of terminal may be supplied.

Figure 9:
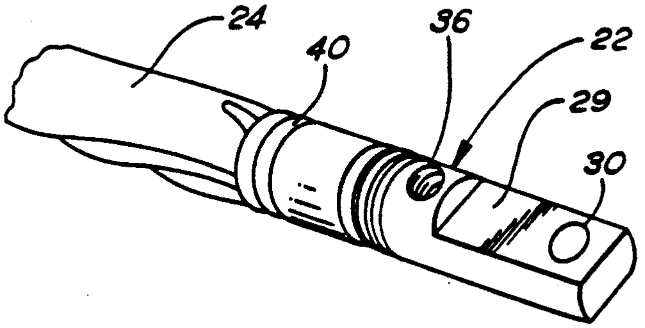
FIG. 9 shows the construction of FIG. 8-A after a terminal has been crimped onto the ferrule.

Each terminal 22 is provided with a fluid passage 35 having a first port 36 and a second port 37 communicating with a ferrule receiving portion 38. The second port 37, by virtue of the depression 27 in the ferrule 26 will communicate directly with the fluid passageway 28 surrounding the wire, braid or rope. As can be seen in FIG. 9, the terminal 22 is crimped to the ferrule surrounding the wire rope or braid 24, as evidenced by the crimp mark 40.

Referring now to FIGS. 5–8, the method or process used in the manufacture of a fluid cooled power conductor embodying the present invention can be seen. The first step in the process is to cut the wire rope 24 to the proper length, and place the tubular ferrule 26 over the end thereof, as shown in FIG. 5. The construction so formed is placed into axially extending, movable pedestal 45. Pedestal 45 is mounted between fixed die 46 having a first arcuate forming surface 47, and transversely movable die 48 having a second arcuate forming surface 49. Pedestal 45 is, itself, movable in the transverse direction. In the preferred embodiment of the present invention, first arcuate forming surface 47 and second arcuate forming surface 49 are identical and have identical reliefs 50 communicating therewith. Different shapes may be used, depending on the application to which the improved process of the present invention is applied.

A ram 51 which may be operated by any of several well-known means in the art, such as by mechanical or hydraulic means, is mounted to reciprocate vertically, as is tool holder 53. The tool holder 53 is axially aligned with the pedestal 45 when in its most transverse position, as explained below. The camming surface 52 provided on ram 51 contacts the mating cam surface 54 of the movable die 48 and begins its movement in a transverse direction as indicated by the arrows.

As can be seen in FIG. 6, the pedestal 45, with ferrule 26 removed for clarity, is seen to be spring mounted by means well known in the art for movement toward and away from the fixed die 46. As cam 51 continues to descend, and movable die 48 continues to move transversely, it will contact the pedestal 45 with the ferrule 26 mounted therein and push it toward the fixed die 46.

Figure 7A:
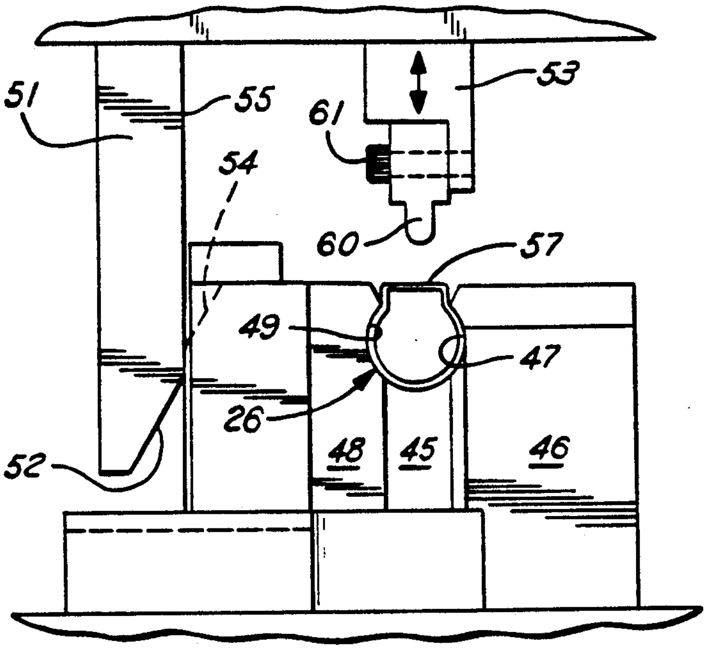
FIG. 7 is a partial perspective view showing the appearance of a construction embodying a portion of the present invention after it has undergone the step illustrated in FIG. 6.
Figure 7:
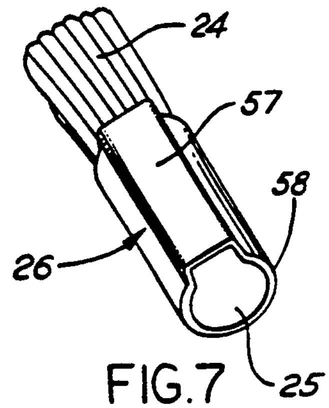

Referring now to FIG. 7A, the apparatus of FIGS. 5A and 6 is shown at a point wherein the ram 51 has continued to move in a downward direction sufficient such that the entire length of camming edge 52 of the ram 51 has travelled over the mating cam surface 54 of the movable die 48, and thus has moved the movable die 48, and the pedestal 45, a maximum amount in the transverse direction.

The pedestal 45 has come into axial alignment with the tool holder 53, and the forming die or tool 60. By the choice of the dimensions of the various components, it can be assured that sufficient forging or swaging force is applied by the arcuate forming surfaces 47 and 49, respectively, to substantially solidify the end of the wire rope or braid 24, and deform the ferrule 26 sufficiently to form it into a semi-circular shape having a boss 57 on top thereof. As can be seen clearly in FIG. 7, the wire rope or braid 24 has a substantially compressed or forged portion 25, and the ferrule 26 has a boss portion 57 and a semi-circular portion 58.

Figure 8:
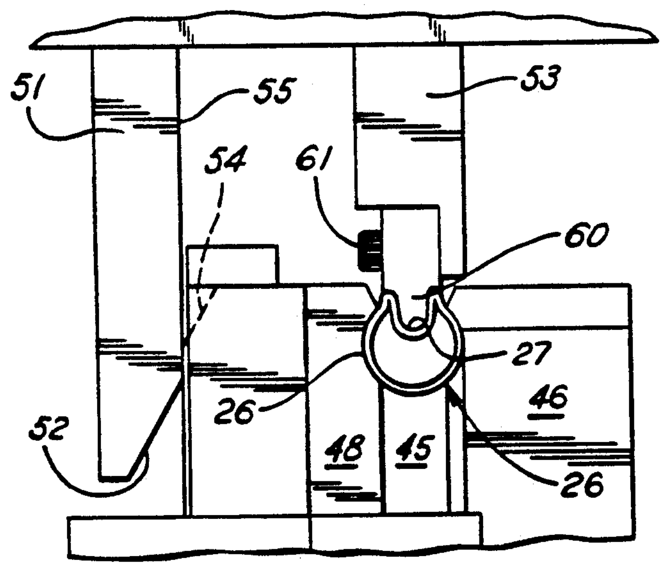
FIG. 8 shows the forming die of FIG. 7-A just as the pressing of the channel into the ferrule of FIG. 7 is completed.

Because of the construction of the apparatus of the present invention, the ram 51 continues its downward travel, with the inside edge 55 thereof maintaining the swaging or forging pressure on the ferrule 26, while the tool holder 53 may move in a downward direction toward the construction consisting of the ferrule 26 and the compressed or forged portion 25 of the wire rope or braid 24. As the tool holder 53 continues to travel in a downward direction, the forming tool 60 held therein by the bolt 61 will come in contact with and press a channel 27 into the ferrule 26, as shown in FIG. 8. As an alternative, the wire rope and ferrule construction formed thus far could be placed in a separate fixture to have the channel or channels 27 pressed therein, but this is not preferred, as additional apparatus and time is required.

Figure 3:
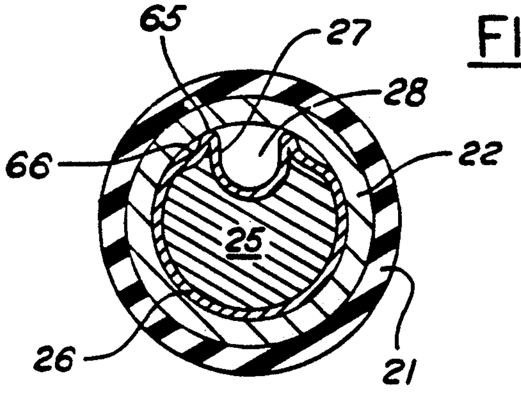
FIG. 3 is a sectional view, taken in the direction of the arrows, along the section line 3—3 of FIG. 2.
Figure 4:
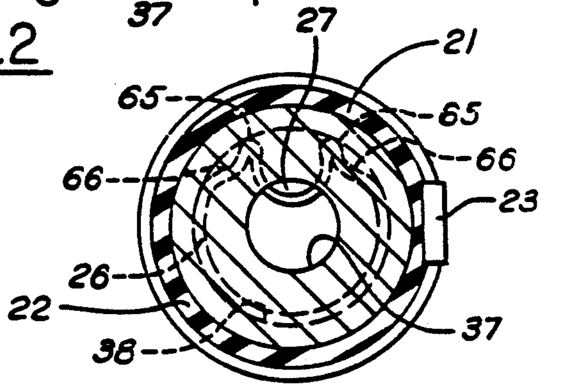
FIG. 4 is a sectional view, taken in the direction of the arrows, along the section line 4—4 of FIG. 2.
Figure 8A:
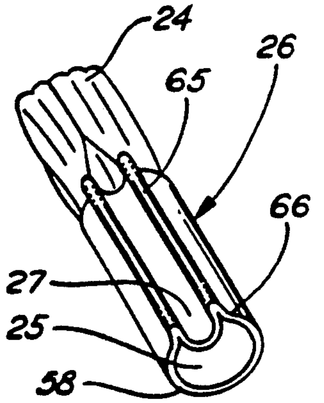

After the ram 51 is returned to its starting position, and the movable die 48 and pedestal 45 have returned to their original positions, the construction shown in FIG. 8A has been formed. The wire rope or braid 24 has the compressed or forged section 25, which has had further pressure applied thereto. The ferrule 26 no includes the semi-circular portion 58 and the channel 27. The boss 57 is no longer apparent, and has been replaced by axially extending ridges 65. Because of the forming process, small concave surface portions 66, best seen in FIGS. 3 and 4, are formed between the semi-circular portion 58 of the ferrule 26 and the ridges 65.

The next step in the construction of the present invention is to place the terminals 22 over the construction in FIG. 8A, and by means well known in the art, crimp the terminal 22 to the ferrule 26. This will leave a crimp or crimp mark 40 on the outside of the terminal.

If the construction formed thus far is to be used in a water cooled power conductor, the steps just described will be repeated on the other end of the wire rope 24, after which a hose 21 that has been precut to the proper length will be placed over the terminal and wire rope construction and clamped in place in a water tight manner by a pair of clamps 23. It should be understood that, although in the preferred embodiment of the present invention, my method and apparatus will be used to form fluid cooled power conductors, there is no reason that the apparatus cannot be used simply for applying terminals to wire ropes or braids, if desired.

Figure 10:
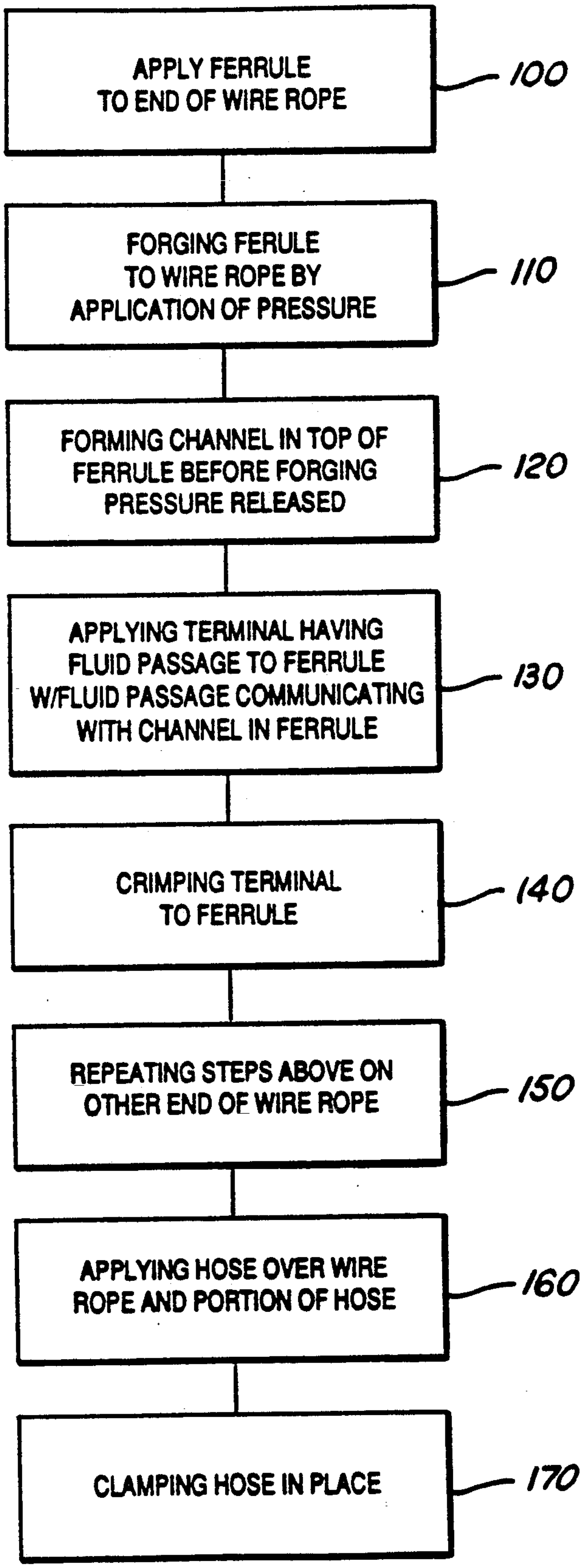
FIG. 10 is a flow chart showing the steps utilized in the method of the present invention.

The steps of my improved method are summarized in FIG. 10, and involve applying a ferrule to a predetermined length of wire rope or braid (step 100), forging the ferrule to the wire rope or braid by application of sufficient pressure (step 110), forming a channel in the top of the ferrule before (or after) the forging pressure is released (step 120), applying a terminal having a fluid passage to the ferrule in a position to have the fluid passage in the terminal communicating with the channel in the ferrule (step 130), crimping the terminal to the ferrule (step 140), and then repeating these steps at the other end of the wire rope or braid (step 150). After the terminal is applied to the other end of the wire rope or braid, a hose of a length slightly greater than the distance between the terminals is slid onto the construction formed thus far, with sufficient hose extending over each terminal (step 160) so that each end of the hose can be clamped to its respective terminal in a water tight manner (step 170).

It can be seen that by performing the first three steps (100), (110) and (120), and then applying a terminal to the ferrule, step (140), a method is also provided for securing terminals to non-fluid carrying conductors or for applying terminals to one end only of a wire rope or braid. Step 120 may be omitted in such applications, if desired.

Thus, by carefully analyzing problems existing in the prior art, an improved fluid cooled power conductor, and a method of producing the same is provided.

I claim:

1. A method of applying a terminal to an end of a wire rope, said method including the steps of:

(a) placing a ferrule on one end of said wire rope;
(b) forging said ferrule to said wire rope by the application of pressure to said ferrule;
(c) maintaining said pressure on said ferrule while forming a channel in the top thereof by the use of a forming die;
(d) placing a unitary terminal having a fluid passage formed therein over said ferrule in a manner such that said fluid passage communicates with said channel formed in said ferrule; and
(e) crimping said terminal to said ferrule.

2. The method defined in claim 1, and including the additional step of:

(a) repeating the steps listed in claim 1 above to apply a terminal to the other end of said wire rope.

3. The method defined in claim 2, and including the additional steps of:

(a) applying a rubber hose over said wire rope or braid such that said rubber hose extends a short distance over each of said terminals; and
(b) applying a clamp to each end of said hose to fix said hose to teach of said terminals in a water tight construction.

4. A method of making a fluid-cooled power conductor, said method including the steps of:

(a) placing a ferrule on opposite ends of a wire rope or braid;
(b) attaching said ferrules to each end of said wire rope or braid by the application of a compressive force to said ferrule;
(c) maintaining said compressive force on said ferrule while forming a channel in the top thereof;
(d) placing a ferrule receiving portion of a unitary terminal over each ferrule, each of said terminals having a fluid passage communicating with said ferrule receiving portion and the channel formed in each ferrule;
(e) crimping said terminals to said ferrules;
(f) applying a covering over said wire rope or braid such that said covering extends a short distance over each of said terminals; and
(g) clamping said covering to said hose to fix said hose to said terminals in a water-tight construction.

5. The method defined in claim 4, wherein the step of applying a compressive force to each of said ferrules includes the step of forging said ferrule to each end of said wire rope or braid.

6. The method defined claim 4, wherein the step of applying a compressive force to said ferrule includes the step of swaging said ferrule to each end of said wire rope or braid.

7. The method defined in claim 5, wherein said covering is a rubber hose.

8. The method defined in claim 5, wherein the step of clamping said hose to each of said terminals in a water-tight construction includes the steps of:

(a) placing an adjustable clamp proximate each end of said hose; and
(b) tightening each clamp sufficiently to seal said hose to said terminal.

9. An apparatus for forging a ferrule to a wire rope or braid and forming a channel therein, said apparatus including:

(a) vertical reciprocating means for operably cycling a second side of the reciprocating means relative to a first side of the reciprocating means in a vertical direction;
(b) an axially extending fixed forming die having an arcuate forming recess and relief formed therein and fixed to said first side of said vertical reciprocating means;
(c) an axially extending pedestal for holding a ferrule during a forming process spring mounted to said axially extending fixed die in a spaced parallel relationship for transverse movement toward and away therefrom;
(d) an axially extending movable die having an arcuate forming recess and a relief formed therein, said movable die being disposed in guide means for establishing a spaced, parallel relationship with said pedestal and said fixed die, and said guide means permitting movement in a transverse direction toward and away from said pedestal and said fixed die, said guide means fixed to the first side of said vertical reciprocating means, said movable die having a cam surface;
(e) a ram fixed to said second side of said vertical reciprocating means having a camming surface moving vertically with said second side toward and away from said movable die, said camming surface operably contacting said cam surface of said movable die as said second side is cycled toward said first side and thereby moving said movable die first into contact with a ferrule mounted on said pedestal, and then moving said ferrule into contact with said fixed die and applying pressure to said ferrule mounted on said pedestal, and then maintaining said pressure, and (f) a tool holder fixed to said second side of said vertical reciprocating means for vertical movement with said ram, said tool holder being in axial alignment with said pedestal when said pedestal is in its most transverse position, and holding a forming tool therein, said forming tool and said tool holder positioned with respect to said ram and operably pressing a channel into said ferrule mounted to said pedestal after said ram has applied said forging pressure, but before said ram beings its upward vertical travel with said second side of said vertical reciprocating means.

* * * * *